United States Patent

Lee

Patent Number: 5,852,551
Date of Patent: Dec. 22, 1998

[54] PULSED WIDTH MODULATION METHOD FOR POWER TRANSFORMING APPARATUS

[75] Inventor: Geun-Ho Lee, Kyungsangnam-Do, Rep. of Korea

[73] Assignee: LG Industrial Systems Co., Ltd., Seoul, Rep. of Korea

[21] Appl. No.: 942,287

[22] Filed: Oct. 1, 1997

[30] Foreign Application Priority Data

Oct. 2, 1996 [KR] Rep. of Korea .................. 1996 43662

[51] Int. Cl.⁶ ................................. H02J 1/02; H02J 3/00; H02M 5/45; H02P 1/46
[52] U.S. Cl. ................................. 363/39; 363/34; 363/37; 363/98; 318/722
[58] Field of Search .................................. 363/39, 34, 35, 363/37, 97, 98, 132, 95; 318/722, 807; 307/44, 45, 46

[56] References Cited

U.S. PATENT DOCUMENTS

| | | |
|---|---|---|
| 3,967,173 | 6/1976 | Stich ........................................ 363/41 |
| 5,182,463 | 1/1993 | Yamamoto et al. ..................... 363/95 |
| 5,585,708 | 12/1996 | Richardson et al. ..................... 318/800 |
| 5,608,301 | 3/1997 | Inaniwa et al. ........................... 363/34 |

*Primary Examiner*—Peter S. Wong
*Assistant Examiner*—Rajnikant B. Patel

[57] ABSTRACT

An improved pulse width modulation method for a power transforming apparatus which is capable of decreasing a switching efficiency loss by providing a phase having the maximum size of a phase current which is not switched. The method includes the steps of a first step for computing a phase voltage command in accordance with a phase of a voltage from the load circuit, a second step for performing a three-phase pulse width modulation with respect to the phase voltage command when the voltage and frequency applied to the load circuit are below a predetermined value, a third step for computing new phase voltage commands which have the same phase as the phase of a current when the voltage and frequency applied to the load circuit are above a predetermined value, and a fourth step for performing a pulse width modulation so that a switching operation having the maximum absolute value of the current among the new phase voltage commands obtained in the third step becomes idle.

8 Claims, 7 Drawing Sheets

PULSED WIDTH MODULATION METHOD FOR POWER TRANSFORMING APPARATUS

BACKGROUND OF THE INVENTION

1. Field of the Invention

The present invention relates to a pulse width modulation method for a power transforming apparatus, and in particular to an improved pulse width modulation method for a power transforming apparatus which is capable of decreasing a switching efficiency loss by causing a switching operation having a maximum current phase among three phases to become idle.

2. Description of the Conventional Art

Recently, the power transforming technique has been developed as the power semiconductor device which is capable of performing a high speed switching operation is developed. The above-described semiconductor device is attributed to significantly reducing noises which are generated in a converter or an inverter, so that it is possible to apply a current having a sine wave to an electric load circuit.

During the switching operation of the power semiconductor device, heat and noises are generated, and in addition, during a low speed switching operation, a high level noise is generated, so that since it is impossible to obtain a sine wave voltage and current, the high speed switching operation is performed. When increasing a switching frequency for enabling a high speed switching operation, the switching efficiency loss occurs, and the temperature of a radiating plate disposed in a circuit is increased and the device may be damaged due to the temperature increased. In order to overcome the above-described problems, much studies have been intensively performed.

FIG. 1 illustrates the construction of a conventional power transforming apparatus which includes a converter 1 having six switching devices QC1 through QC6 for converting an alternating current AC into a direct current in accordance with first driving signals dc1 through dc6, a smoothing condenser C for smoothing the thusly converted direct current voltage, an inverter 2 provided with six switching devices Q11 through Q16 for converting the thusly smoothed direct current voltage into an alternating current voltage, a motor M which is operable in accordance with the converted alternating voltage inputted thereto, a current controller 3 for detecting a current which is applied from the previous circuit of the motor M to the motor M and converting the thusly detected voltage into voltages Vqe, Vde of a fixed coordinate, a controller 4 for receiving the output voltages Vqe, Vde, controlling the received output voltages, and outputting first and second switching signals cc1 through cc3 and ci1 through ci3, a first driving unit 5 for converting the levels of the first switching signals cc1 through cc3 and applying the first driving signals dc1 through dc6 to the gates of the six switching devices QC1 through QC6 of the converter 1, and a second driving unit 6 for converting the levels of the second switching signals ci1 through ci3 and applying the second driving signals di1 through di6 to the gates of the six switching devices Q11 through Q16 of the inverter 2.

The operation of the conventional power converting apparatus will now be explained.

When the motor M is driven by a predetermined voltage and frequency using the converter 1 and the inverter 2 in accordance with the characteristic of the motor M, the current controller 3 detects a voltage, current, speed, etc. applied to the motor M, and the current controller 3 outputs voltages Vqe, Vde of a rotational coordinate. The controller 4 performs a pulse width modulation with respect to the output voltages Vqe, Vde and the phases thereof in accordance with a previously set program and outputs a switching command, namely, the first and second switching signals cc1 through cc3 and ci1 through ci3 in a form of voltage, and the levels of the first switching signals cc1 through cc3 are converted by the first driving unit 5, and then are applied to the switching devices QC1 through QC6 of the converter 1, respectively. The switching devices QC1 through QC6 are switched thereby, and the levels of the second switching signals ci1l through ci3 are converted by the second driving unit 6 and then are applied to the switching devices Q11 through Q16 of the inverter 2. The switching devices Q11 through Q16 are switched, so that the motor M which receives a variable voltage and variable frequency power is driven at a predetermined speed.

In the conventional pulse width modulation method which is directed to receiving the output voltages Vqe, Vde from the current controller 3 and generating a switching signal in order to switch the converter 1 and the inverter 2, respectively, there are known two methods. Namely, in the first method, the sine wave and the triangle shape wave are compared, thus obtaining a pulse width-modulated signal, and in the second method, the pulse width modulation is performed with respect to the voltage. The first method will be described with respect to the three phase and two phase.

FIG. 2 illustrates a wave form diagram of a voltage signal based on the conventional three phase pulse width modulation method. Reference characters Vas_r, Vbs_r and Vcs_r denote the phase voltage commands of u-phase, v-phase, and w-phase each having the identical frequency as the waves forms of the interline voltage which is applied from the inverter 2 to the motor M, and reference numeral PWM denotes a triangle shape wave form of a signal from the controller 4, and reference characters PWM_U, PWM_V and PWM_W are second switching signals ci1 through ci3 from the controller 4.

The current controller 3 receives output voltages Vqe, Vde of the rotational coordinates based on the phase θ of a voltage and converts the received voltages into the voltage of the fixed coordinate, and the controller 4 generates phase voltage commands Vas_r, Vbs_r and Vcs_r of sine wave forms with respect to each phase, and the thusly generated command values are compared with the triangle shape wave PWM which becomes a reference of the pulse width modulation.

As a result of the comparison, when the size of each of the phase voltage commands Vas_r, Vbs_r and Vcs_r is higher than the that of the triangle shape wave PWM, the signal becomes a high level state, and when the size of each of the phase voltage commands Vas_r, Vbs_r and Vcs_r is not higher than the same, the low level second switching signals PWM_U, PWM_V and PWM_W are outputted, and the second driving unit 6 amplifies the levels of the second switching signals PWM_U, PWM_V and PWM_W, and then the driving signals di1 through di6 are outputted, and the switching devices Q11 through Q16 of the inverter 2 are switched.

In addition, since the triangle shape wave PWM is a high frequency signal, the switching frequencies of the switching devices Q11 through Q16 which are switched by the high frequency becomes a high frequency thereby. The higher the switching frequency, the more the switching efficiency loss. Therefore, the devices may be damaged due to the temperature increase of the radiating plate which cools the semiconductor devices and semiconductor chip.

In order to overcome the above-described problems, the two phase pulse width modulation method is used, which is classified into two methods. In the first method, the switching operation of the phase having the maximum relative value of the voltage among three phases becomes idle, and in the second method, the switching operation having the maximum absolute value of the voltage becomes idle. The first method will be described in more detail.

FIG. 3 illustrates a flow chart of a method of causing a switching operation having the maximum relative value of the voltage to become idle in the two phase width modulation method. The method of FIG. 3 will be described with reference to FIG. 4.

First, the output voltages Vqe, Vde of the rotational coordinate of the current controller 3 are reversely converted into the phase voltage commands Vas_r, Vbs_r and Vcs_r of the fixed coordinate based on the phase θ of the voltage, and then the lowest voltage among the three phase voltage commands Vas_r, Vbs_r and Vcs_r, namely, the voltage Vcs_r, is added by the peak value PWM_max of the triangle shape wave PWM, thus computing a compensation voltage V_comp. In addition, the compensation voltage V_comp is subtracted from the phase voltage commands Vas_r, Vbs_r and Vcs_r, thus obtaining new phase voltage commands Vas_c, Vbs_c, Vcs_c.

The new phase voltage commands Vas_c, Vbs_c, Vcs_c are compared with the triangle shape wave PWM, thus computing switching signals PWM_U, PWM_V, PWM_W. The wave forms of the new phase voltage commands Vas_c, Vbs_c, Vcs_c are shown in FIG. 5. In the drawings, "a" denotes an interline voltage wave form of the phase voltage commands Vas_c and Vbs_c, and PWM_U denotes a switching signal which is a result of the phase voltage command Vas_c and the triangle shape wave PWM.

As shown therein, the switching operation of the switching signal PWM_U becomes idle within an angle range of 120° between 180°~360° in which the size of the phase voltage command Vas_c is −1.

Next, in the two-phase pulse width modulation method, the method for causing the switching operation of the phase having the maximum absolute value of the voltage to become idle will now be explained with reference to FIG. 6.

The output voltages Vqe, Vde of the rotational coordinate of the current controller 3 are reversely converted into the phase voltage commands Vas_c, Vbs_c, Vcs_c of the fixed coordinate, and the voltage Vmax having the maximum size among the three phase voltage commands Vas_r, Vbs_r, Vcs_r is searched, and the absolute value of the voltage Vmax, namely, the voltage Vabs, is subtracted from the peak value PWM_max of the triangle shape wave, thus computing a compensation voltage V_comp.

Next, if the code of the voltage Vmax is a positive value, the phase voltage commands Vas_r, Vbs_r, Vcs_r are added by the compensation voltage V-comp, and on the contrary, the code thereof is a negative value, the compensation voltage V_comp is subtracted from the phase voltage commands Vas_r, Vbs_r, Vcs_r, thus computing new phase voltage commands Vas_c, Vbs_c, Vcs_c. The wave forms of the thusly computed phase voltage commands Vas_c, Vbs_c, Vcs_c are shown in FIG. 7. In the drawings, PWM_U denotes a switching signal PWM_U which is a result of the comparison of the phase voltage command Vas_c and the triangle shape wave PWM.

As shown therein, if the switching operation of the switching signal PWM_U becomes idle within an angle range of 60° near an angle of 90° at which the size of the phase voltage command Vas_c is more than +1, and becomes idle within an angle range of 60° near an angle of 270° at which the size thereof is below −1.

As described above, the conventional two-phase pulse width modulation method which is directed to cause the switching operation of the phase to become idle which have the maximum relative value or absolute value within each interval in accordance with the frequency of the voltage has a problem in that the switching efficiency loss is decreased compared to the three-phase pulse width modulation method.

However, since the switching efficiency loss is dependent on the size of the current, when the motor having an inductance component is used, it is impossible to obtain a switching efficiency loss prevention effect in the conventional art. Namely, if the power factor is not 1, the phase difference of the voltage and current occurs. The lower the power factor, the more the switching operation becomes idle at a portion at which the current value is low. Therefore, it is impossible to obtain a desired effect in the case that the power factor is low.

SUMMARY OF THE INVENTION

Accordingly, it is an object of the present invention to provide a pulse width modulation method for a power transforming apparatus which overcomes the aforementioned problem encountered in the conventional art.

It is another object of the present invention to provide an improved pulse width modulation method for a power transforming apparatus which is capable of decreasing a switching efficiency loss by providing a phase having the maximum size of a phase current which is not switched.

It is another object of the present invention to provide an improved pulse width modulation method for a power transforming apparatus which is capable of judging the size of the voltage and the size of the frequency and selectively using a three-phase and two-phase pulse width modulation methods in order to overcome the problems that when the size or frequency of the voltage applied to the motor is low, in the two-phase pulse width modulation method, more torque ripple and noises occur compared to the three-phase width modulation method.

To achieve the above objects, there is provided a pulse width modulation method for a power transforming apparatus according to a first embodiment of the present invention which includes the steps of a first step for computing a phase voltage command in accordance with a phase of a voltage applied to the load circuit, a second step for performing a three-phase pulse width modulation with respect to the phase voltage command when the voltage and frequency applied to the load circuit are below a predetermined value, a third step for computing new phase voltage commands which have the same phase as the phase of a current when the voltage and frequency applied to the load circuit are the predetermined value, and a fourth step for performing a pulse width modulation so that a switching operation of a phase having the maximum absolute value of the current among the new phase voltage commands obtained in the third step becomes idle.

To achieve the above objects, there is provided a pulse width modulation method for a power transforming apparatus according to a second embodiment of the present invention which includes the steps of a first step for computing a phase voltage command in accordance with a phase of a voltage applied to a load circuit, a second step for computing new phase voltage commands having the same phase as the phase of the current, and a third step for performing a pulse width modulation so that a switching operation of a phase having the maximum absolute value of the current among the new phase voltage commands obtained in the second step becomes idle.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 8:
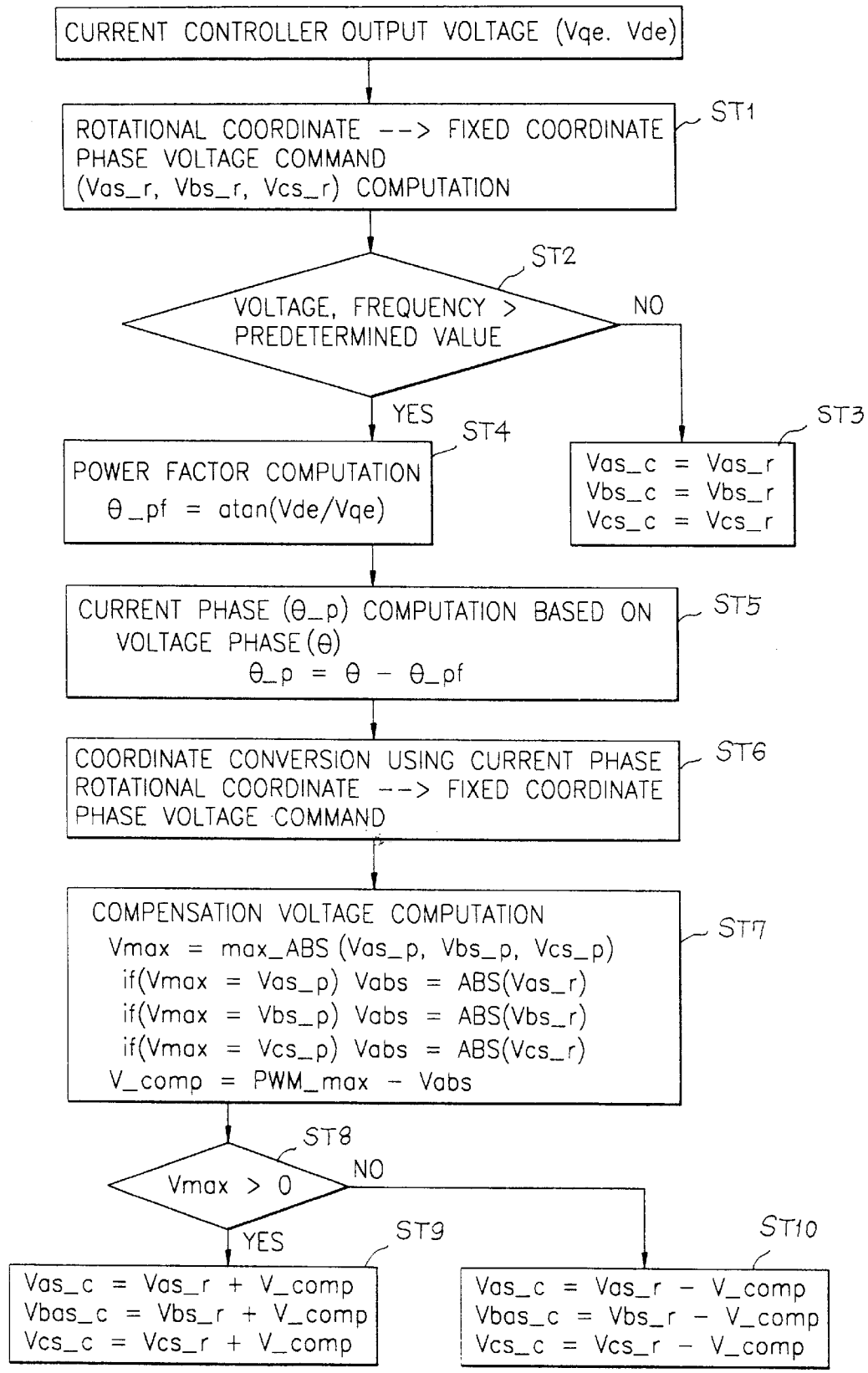
FIG. 8 is a flow chart of a pulse width modulation method according to the present invention.

The pulse width modulation method for a power transforming apparatus according to the present invention will now be explained with reference to FIGS. 8 and 9.

The method for reversely converting the rotational coordinate output voltages Vqe, Vde into the phase voltage commands Vas_c, Vbs_c, Vcs_c of the fixed coordinate based on the phase θ of the voltage is performed identically to the conventional art in Step ST1.

Thereafter, the sizes of the voltage and frequency of the output voltages Vq2, Vde are judged, and are compared with a predetermined value in Step ST2. The predetermined value is a reference value in order determine whether three-phase pulse width modulation is performed, or two-phase pulse width modulation is performed. If the size of the voltage or the frequency is below a predetermined value, it means that the three-phase pulse width modulation method is performed due to the high frequency component of the current.

Figure 2:
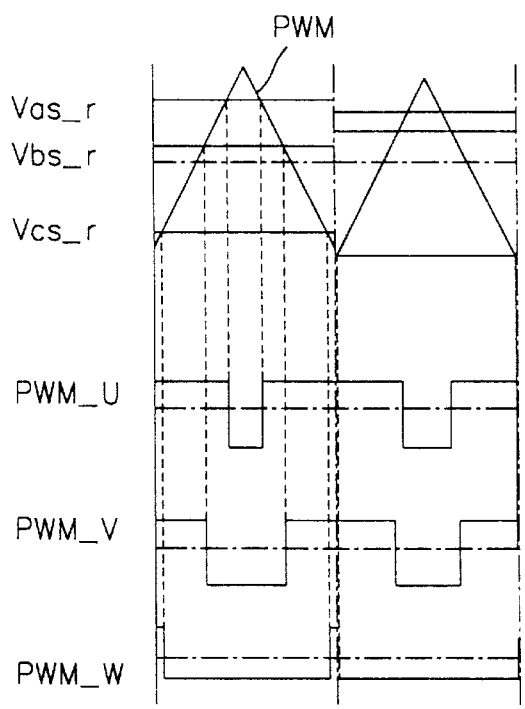
FIG. 2 is a wave form diagram of a signal based on a conventional three-phase pulse width modulation method.
Figure 3:
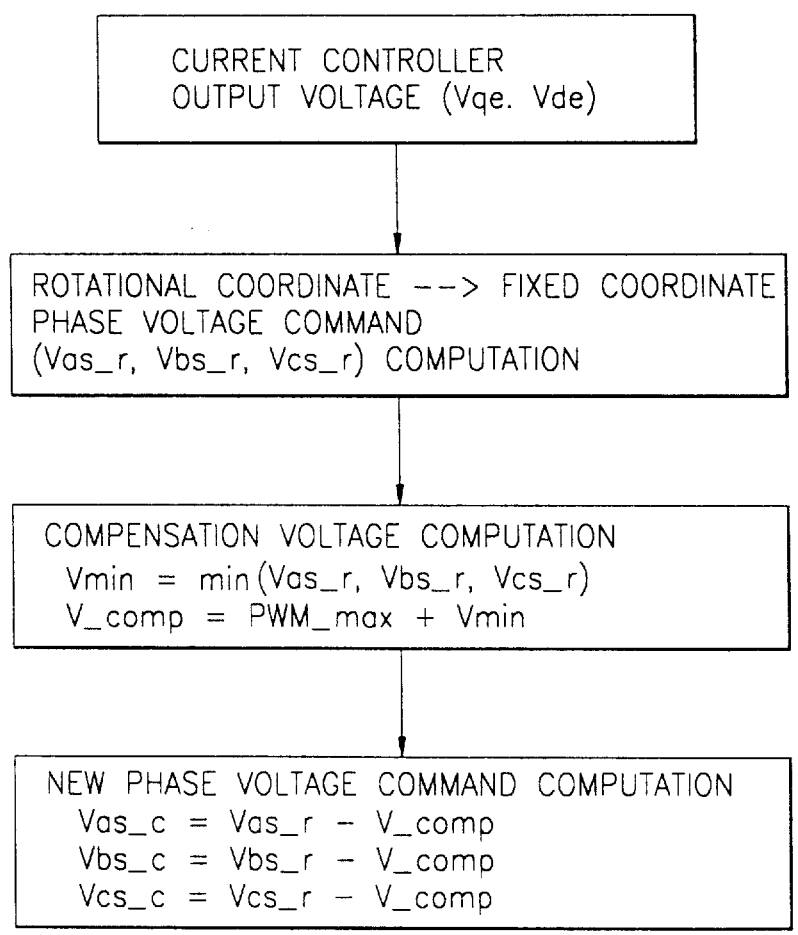
FIG. 3 is a flow chart illustrating a method in which a switching operation of a phase having the maximum relative value of a voltage becomes idle in the conventional two-phase pulse width modulation method.
Figure 4:
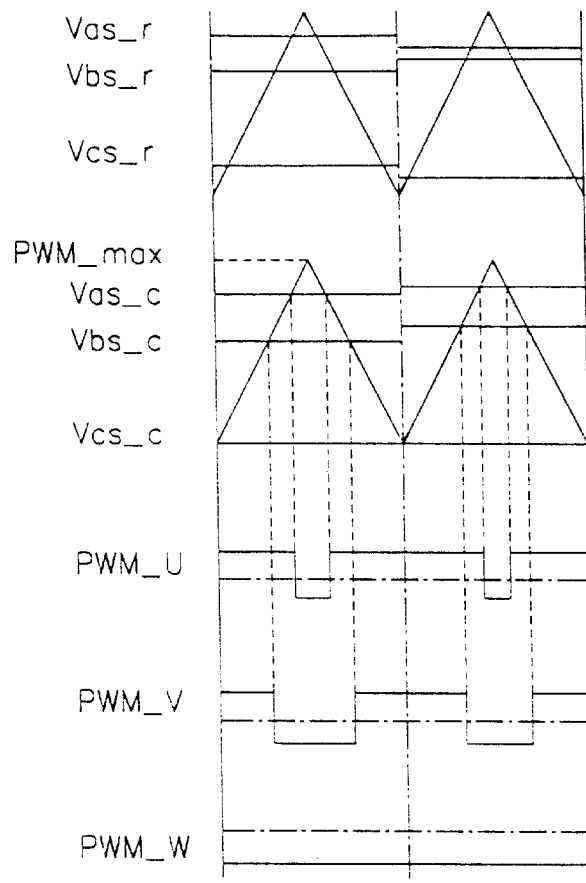
FIG. 4 is a wave form diagram of a voltage signal within a predetermined interval in the method of FIG. 3.
Figure 5:
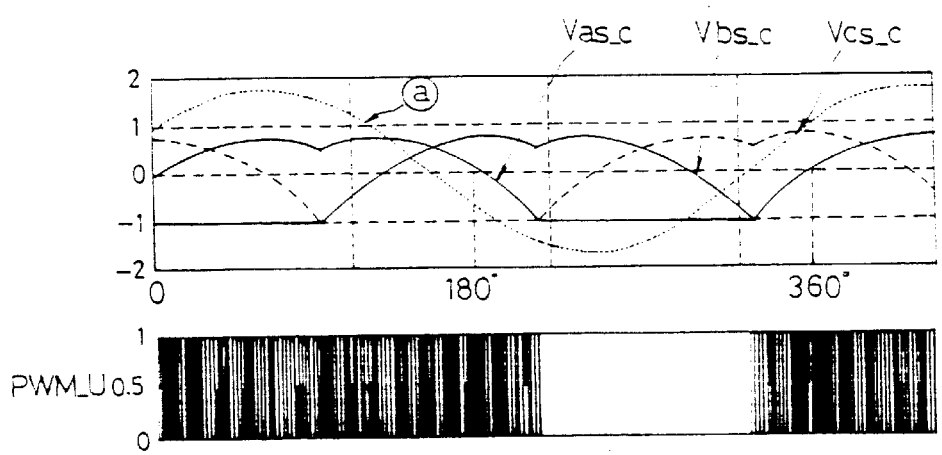
FIG. 5 is a wave form diagram of phase voltage commands Vas_c, Vbs_c, Vcs_c and a switching signal PWM_U in the method of FIG. 3.
Figure 6:
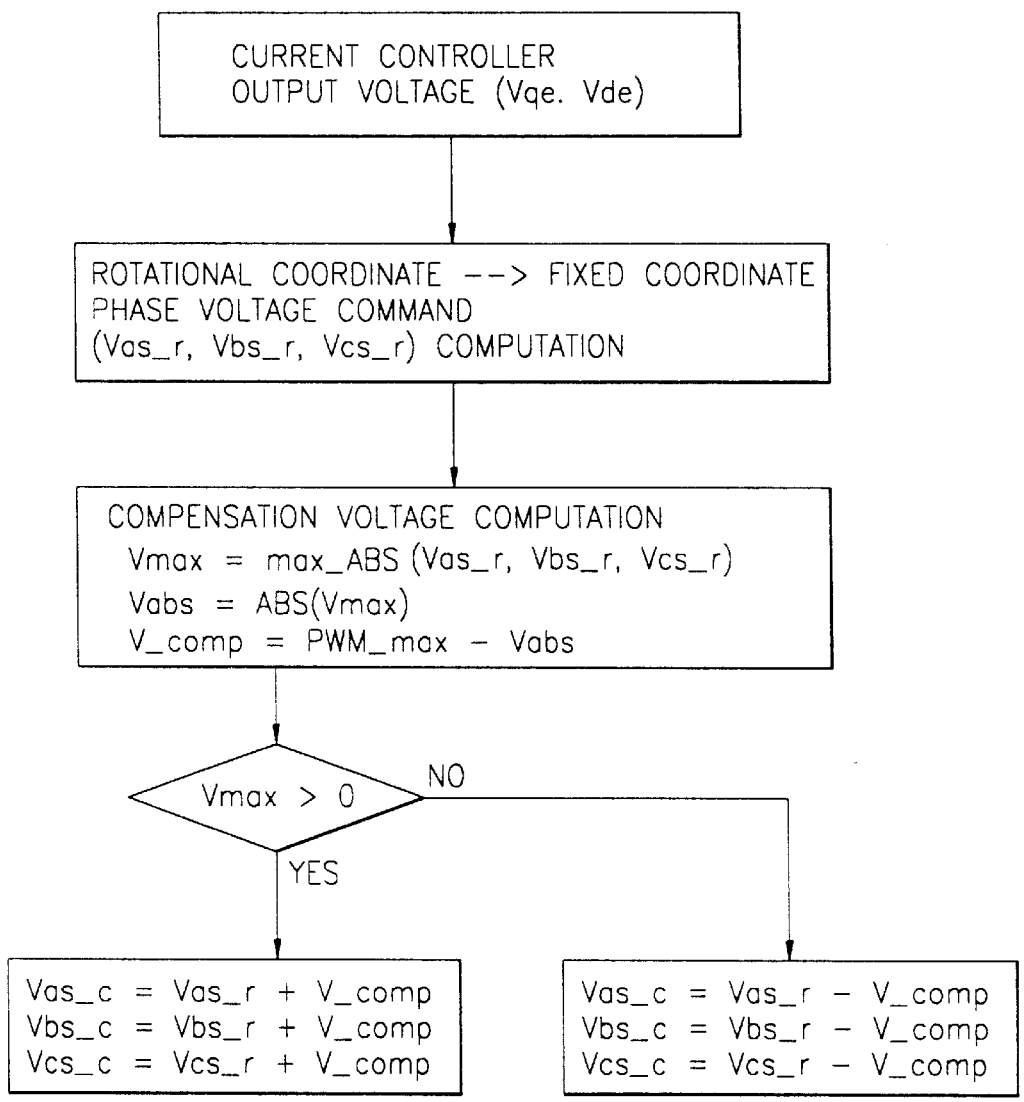
FIG. 6 is a flow chart of a method in which a switching operation of a phase having the maximum absolute value of a voltage becomes idle in the conventional two-phase pulse width modulation method.
Figure 7:
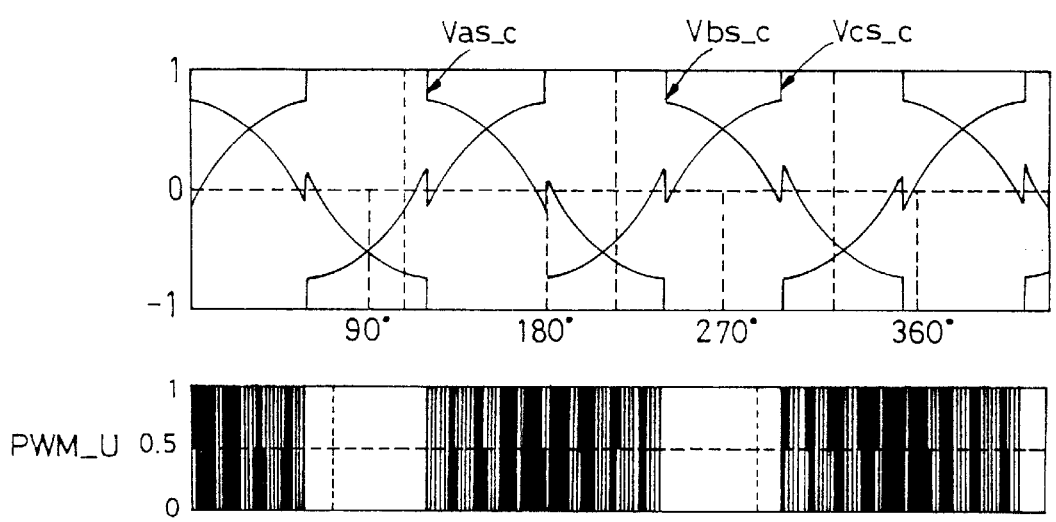
FIG. 7 is a wave form diagram of phase voltage commands Vas_c, Vbs_c, Vcs_c and a switching signal PWM_U obtained by the method of FIG. 6.

If the sizes of the voltage and frequency are below a predetermined value, identically to the description of the three-phase pulse width modulation method, the phase voltage commands Vas_r, Vbs_r, Vcs_r shown in FIG. 2 are substituted with phase voltage commands Vas_c, Vbs_c, Vcs_c, and the phase voltage commands Vas_r, Vbs_c, Vcs_r are compared with a triangle shape wave PWM in Step ST3. Thereafter, the switching signals PWM_U, PWM_V, PWM_W are outputted, and the pulse width modulation is finished. The phase voltage commands Vas_c, Vbs_c, Vcs_r is substituted with the phase voltage commands Vas_c, Vbs_c, Vcs_so that the codes of the phase voltage commands computed in the two-phase modulation method according to the present invention can be identical with the codes of the phase voltage commands computed in the three-phase pulse width modulation method.

On the contrary, if the sizes of the voltage and frequency are above a predetermined value, the two-phase pulse width modulation method which is directed to the switching operation of the phase having the maximum absolute value of a current to become idle is performed.

The power factor θ_pf which is the phase difference of the voltage and current is computed in Step ST4 based on the output voltages Vqe, Vde.

[Equation 1]

$$\theta\_pf = a\tan\left(\frac{Vde}{Vqe}\right)$$

When subtracting the power factor θ_pf from the voltage phase θ, the current phase θ_p is obtained in Step ST5, and the output voltages Vqe, Vde of the rotational coordinate are reversely converted into new phase voltage commands Vas_p, Vbs_p, Vcs_p of the fixed coordinate based on the current phase θ_p in Step ST6. At this time, the phase voltage commands Vas_p, Vbs_p, Vcs_p become identical to the phase of the current.

Next, the maximum value Vmax having the maximum absolute value among three phase voltage commands Vas_c, Vbs_c, Vcs_c are computed. If the value Vmax is the phase voltage command Vas_p, the original phase voltage command Vas_r is subtracted from the triangle shape wave peak value PWM_max, and if the value Vmax is the phase voltage command Vbs_p, the original phase voltage command Vbs_r is subtracted from the triangle shape wave peak value PWM_max, and if the value Vmax is the phase voltage command Vcs_p, the original phase voltage command Vcs_r is subtracted from the triangle shape wave peak value PWM_max, thus computing a compensation voltage V_comp in Step ST7. If the maximum value Vmax is a positive code value, the compensation voltage V_comp is added to the phase voltage commands Vas_r, Vbs_r, Vcs_r, respectively, and on the contrary, the maximum value Vmax is a negative code value, the compensation voltage V_comp is subtracted from the phase voltage commands Vas_r, Vbs_r, Vcs_r, respectively, thus computing new phase voltage commands Vas_c, Vbs_c, Vcs_c.

Figure 1:
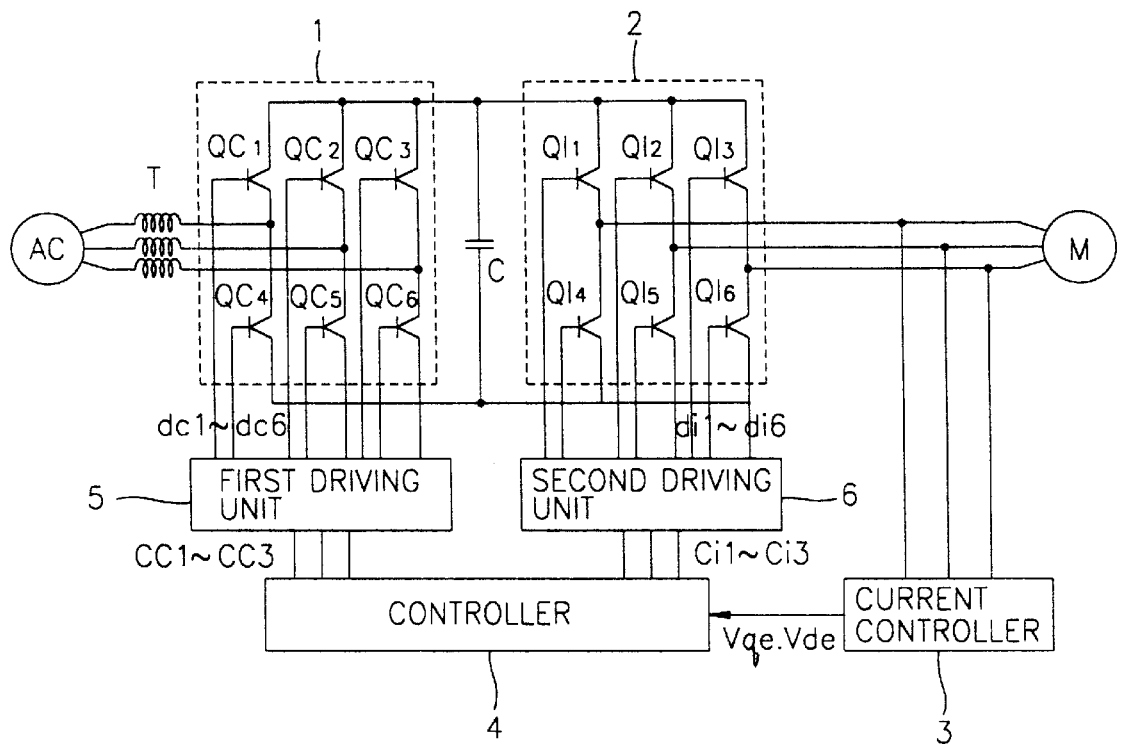
FIG. 1 is a circuit diagram illustrating a conventional power transforming apparatus which performs a pulse width modulation.

The phase voltage commands Vas_c, Vbs_c, Vcs_c are compared with the triangle shape wave PW, and the switching signals PWM_U, PWM_V, PWM_W are outputted to the first and second driving units 5 and 6 of FIG. 1.

Figure 9A:
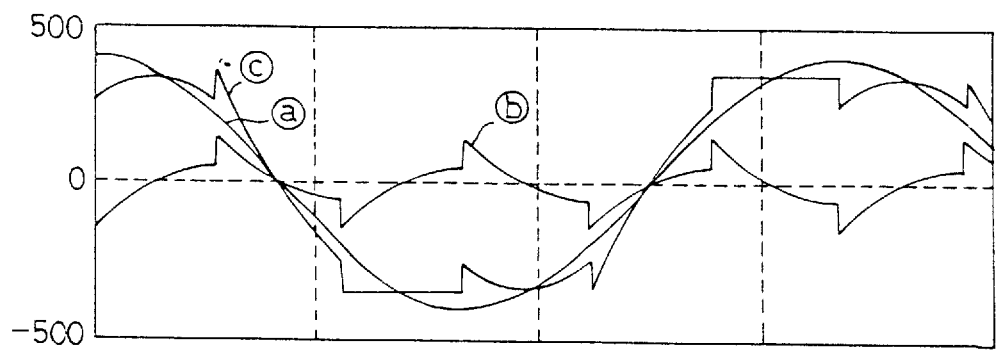
FIG. 9A is a wave form diagram of a phase voltage command Vas_r, a compensation voltage V_comp, and a new phase voltage command Vas_c in the method according to the present invention.
Figure 9B:
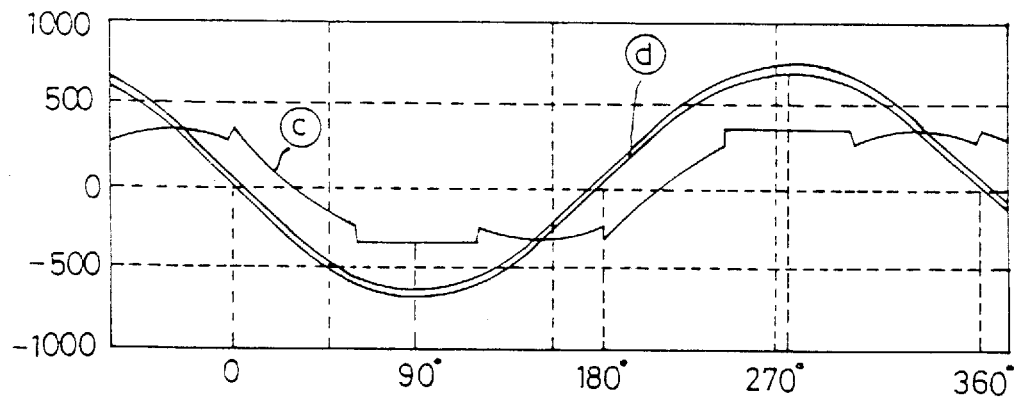
FIG. 9B is a wave form diagram of a new phase voltage command Vas_c and a current in the method according to the present invention.

In FIG. 9A, "a" denotes a predetermined phase voltage command among three phase voltage commands Vas_c, Vbs_c, Vcs_c, and "b" denotes a compensation voltage V_comp. In addition, "c" denotes new phase voltage commands Vas_c, Vbs_c, Vcs_c which are determined by the computation of the voltage "a" and voltage "b". Assuming that "a" is Vas_r, "c" becomes Vas_c. As shown in FIG. 9B, the switching operation of "c", namely, the phase voltage command Vas_c becomes idle near angles of 90° and 270° at which the absolute value of the supply current becomes maximum, so that the wave form of the phase voltage command Vas_c is shown in a straight line form in the idle switching operation.

In addition, since the power factor θ_pf which is computed based n the output voltages Vqe, Vde from the current controller is a predetermined value which is determined based on the load, namely, the resistance and inductance of the motor M, the characteristic of th motor M, the size of the radiating plate, etc. are judged before operating the power transforming apparatus, and then the power factor is determined. Thereafter, the power factor is set into the controller 4, so that it is not needed to repeatedly compute the power factor at every interval in the pulse width modulation method according to the present invention.

As described above, in the present invention, it is possible to significantly reduce the amount of heat which is generated in the semiconductor chip without performing a switching operation within an interval within which the absolute value of the current is maximum. In addition, since three-phase or two-phase pulse width modulation is performed in accordance with a voltage and frequency, it is possible to decrease the loss of switching operation, whereby the size of the radiating plate of the power transforming apparatus is decreased thereby, and a small capacity semiconductor device may be used in the system, and it is possible to increase the switching frequency.

Although the preferred embodiment of the present invention has been disclosed for illustrative purposes, those skilled in the art will appreciate that various modifications, additions and substitutions are possible, without departing from the scope and spirit of the invention as recited in the accompanying claims.

What is claimed is:

1. In a power transforming apparatus which is capable of applying a voltage, current and frequency of an alternating current to a load circuit, detecting a voltage and frequency supplied to the load circuit, and performing a pulse width modulation with respect thereto, a pulse width modulation method using the power transforming apparatus, comprising the steps of:

a first step for computing a phase voltage command in accordance with a phase of a voltage applied to the load circuit;

a second step for performing a three-phase pulse width modulation with respect to the phase voltage command when the voltage and frequency applied to the load circuit are below a predetermined value;

a third step for computing new phase voltage commands which have the same phase as the phase of a current when the voltage and frequency applied to the load circuit are the predetermined value; and a fourth step for performing a pulse width modulation so that a switching operation having the maximum absolute value of the current among the new phase voltage commands obtained in the third step becomes idle.

2. The method of claim 1, wherein said third step includes the sub-steps of:

a first sub-step for computing a power factor based on the phase of the voltage when the voltage and frequency applied to the load circuit are above a predetermined level;

a second sub-step for computing a phase of the current based on the power factor and the phase of the voltage; and a third sub-step for computing new phase voltage command having the identical phase as the phase of the current.

3. The method of claim 1, wherein said third step includes the sub-steps of:

a first sub-step for computing a current phase based on the previously set power factor and a phase of the voltage when the voltage and frequency applied to the load circuit is the predetermined level; and a second sub-step for computing new phase voltage command having the identical phase as the phase of the current.

4. The method of claim 1, wherein said fourth step includes the sub-steps of:

a first sub-step for comparing the sizes of the absolute values of the new phase voltage command;

a second sub-step for subtracting the phase voltage command of a phase having the maximum absolute value from the maximum value of a triangle shape wave and computing a compensation voltage; and a third sub-step for adding the compensation voltage when the code of the phase voltage command having the maximum absolute value in the second sub-step is a positive value and subtracting the compensation voltage when the code thereof is a negative value.

5. In a power transforming apparatus which is capable of applying a voltage, current and frequency of an alternating current to a load circuit, detecting a voltage and frequency supplied to the load circuit, and performing a pulse width modulation with respect thereto, a pulse width modulation method using the power transforming apparatus includes:

a first step for computing a phase voltage command in accordance with a phase of a voltage applied to a load circuit;

a second step for computing new phase voltage commands having the same phase as the phase of the current; and a third step for performing a pulse width modulation so that a switching operation of a phase having the maximum absolute value of the current among the new phase voltage commands obtained in the second step becomes idle.

6. The method of claim 5, wherein said second step includes the sub-steps of:

a first sub-step for computing a power factor based on the phase of the voltage;

a second sub-step for computing a phase of a current based on the power factor and the phase of the voltage; and a third sub-step for computing new phase voltage command having the identical phase as the phase of the current.

7. The method of claim 5, wherein said second step includes the sub-steps of:

a first sub-step for computing a phase of a current based on the previously set power factor and a phase of the voltage; and a second sub-step for computing new phase voltage commands having the identical phase as the phase of the current.

8. The method of claim 5, wherein said third step includes the sub-steps of:
- a first sub-step for comparing the sizes of the absolute values of the new phase voltage commands;
- a second sub-step for subtracting the phase voltage command of a phase having the maximum absolute value from the maximum value of a triangle shape wave and computing a compensation voltage; and
- a third sub-step for adding the compensation voltage when the code of the phase voltage command having the maximum absolute value in the second sub-step is a positive value and subtracting the compensation voltage when the code thereof is a negative value.

* * * * *